United States Patent
Suzuki et al.

(10) Patent No.: US 7,336,321 B2
(45) Date of Patent: Feb. 26, 2008

(54) VIDEO SIGNAL PROCESSOR

(75) Inventors: Makiko Suzuki, Tokyo-to (JP); Junichi Hasegawa, Yokohama (JP)

(73) Assignee: Victor Company of Japan, Limeited, Yokohama, Kanagawa-ken (JP)

( * ) Notice: Subject to any disclaimer, the term of this patent is extended or adjusted under 35 U.S.C. 154(b) by 539 days.

(21) Appl. No.: 10/970,394

(22) Filed: Oct. 22, 2004

(65) Prior Publication Data

US 2005/0088574 A1    Apr. 28, 2005

(30) Foreign Application Priority Data

Oct. 24, 2003    (JP)    .............................. 2003-364203
Dec. 15, 2003    (JP)    .............................. 2003-416040

(51) Int. Cl.
H04N 9/77    (2006.01)
H04N 9/78    (2006.01)

(52) U.S. Cl. ........................ 348/663; 348/668; 348/669

(58) Field of Classification Search ........ 348/663–670, 348/619, 620
See application file for complete search history.

(56) References Cited

U.S. PATENT DOCUMENTS 5,990,978 A * 11/1999 Kim et al. .................. 348/663
6,667,776 B1 * 12/2003 Sumiyoshi et al. ......... 348/669
6,795,126 B1 *  9/2004 Lee ............................ 348/663

FOREIGN PATENT DOCUMENTS

JP    06054343 A    *    2/1994
JP    2003-070018         3/2003

* cited by examiner

Primary Examiner—M. Lee
(74) Attorney, Agent, or Firm—The Nath Law Group; Gerald L. Meyer; Stanley N. Protigal

(57) ABSTRACT

A simplified Y/C separation circuit separates a composite video signal into a first luminance signal and a first color signal without subjecting the composite video signal to three-dimensional processing. A color demodulation circuit color-demodulates the first color signal into a first color difference signal. A three-dimensional processing portion removes an image quality debasing component by performing three-dimensional processing with respect to the first luminance signal and the first color difference signal or a second luminance signal constituting a component video signal and a second color difference signal. A selector selectively supplies the first luminance signal and the first color difference signal or the second luminance signal and the second color difference signal to the three-dimensional processing portion.

16 Claims, 8 Drawing Sheets

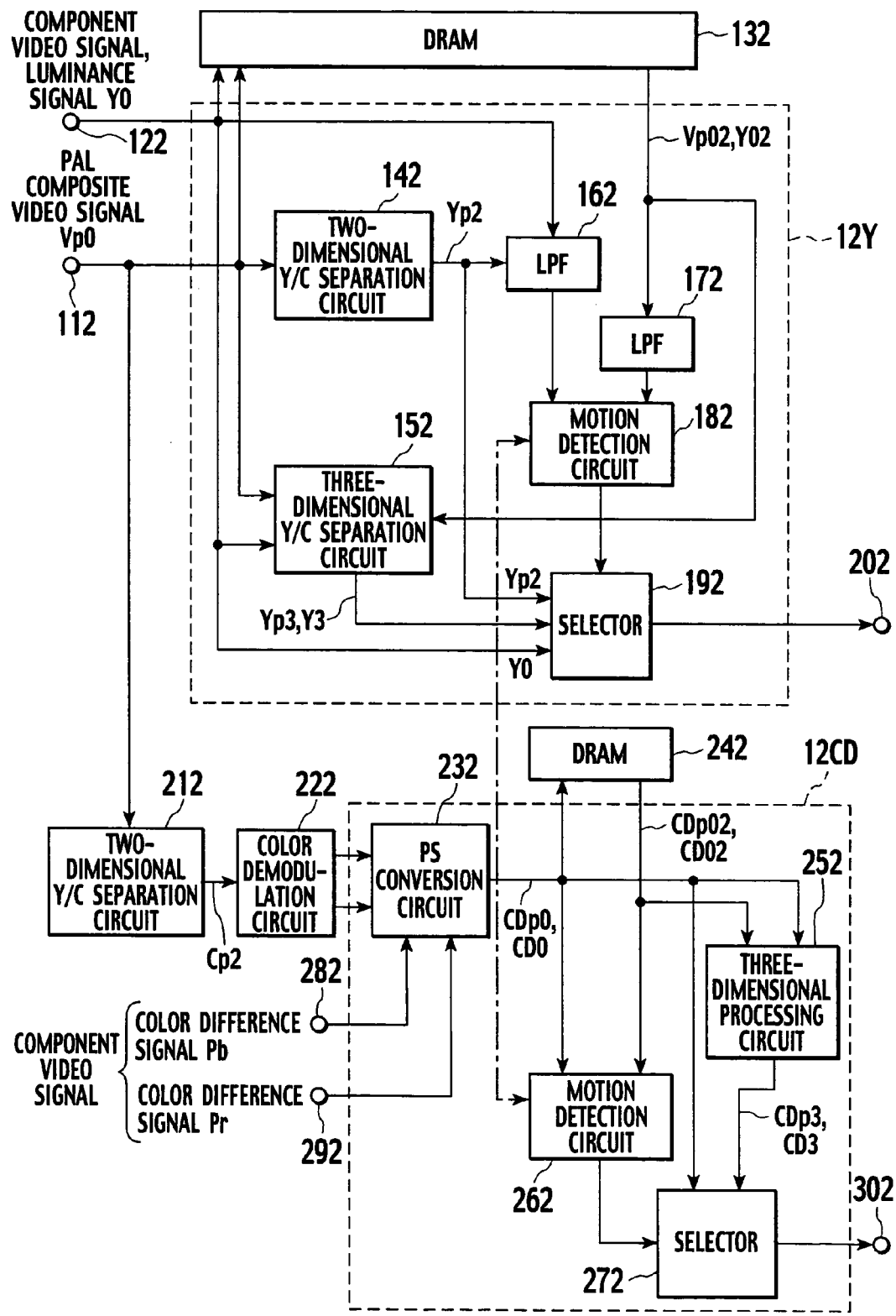

VIDEO SIGNAL PROCESSOR

BACKGROUND OF THE INVENTION

1. Field of the Invention

The present invention relates to a video signal processor which determines a composite video signal or a component video signal as an input video signal, and more particularly, it relates to a video signal processor which can remove an image quality debasing component in a composite video signal and a component video signal to improve the image quality.

2. Description of the Related Art

As video signals to be input to an image display apparatus, there are a composite video signal, such as an NTSC signal or a PAL signal, in which a luminance (Y) signal is composed with a color (C) signal, and a component video signal in which a luminance signal is separated from a color signal or a color difference signal. When a composite video signal is determined as an input video signal, a luminance signal and a color signal must be accurately separated from each other or else a dot interference by which a color signal component is mixed in a luminance signal or a cross-color interference by which a luminance signal is mixed in a color signal occurs. Thus, in order to display a high-quality picture without such a dot interference or cross-color interference, a luminance signal and a color signal must be accurately separated from each other.

In order to accurately separate a luminance signal and a color signal from each other, a motion adaptive three-dimensional Y/C separation circuit utilizing a frame correlation is used. The motion adaptive three-dimensional Y/C separation circuit performs two-dimensional processing utilizing a line correlation with respect to a moving image portion and performs three-dimensional processing utilizing a frame correlation with respect to a static image portion, thereby separating a luminance signal and a color signal from each other.

FIG. 1 is a block diagram showing a schematic structure of a general video signal processor including a three-dimensional Y/C separation circuit, in which a composite video signal and a component video signal is determined as input video signals. In FIG. 1, a composite video signal is input to an input terminal 1, and a component video signal is input to an input terminal 2. The composite video signal is input to a motion adaptive three-dimensional Y/C separation circuit 3, and the three-dimensional Y/C separation circuit 3 performs three-dimensional Y/C separation by using a signal subjected to frame delay with a frame memory 4. Here, the three-dimensional Y/C separation circuit 3 and the frame memory 4 are very simplified and conceptually shown. A luminance signal Y and a color signal C output from the three-dimensional Y/C separation circuit 3 are input to a color demodulation circuit 5. The color demodulation circuit 5 color-demodulates the color signal C, converts it into a color difference signal CD, delays the luminance signal Y, performs time adjustment of the luminance signal Y and the color difference signal CD, and outputs them.

The luminance signal Y and the color difference signal CD output from the color demodulation circuit 5 are supplied to an output terminal 7 through a terminal a of a switch 6. The luminance signal Y and the color difference signal CD output from the output terminal 7 are supplied to another signal processing circuit which is not shown, and displayed in a display portion. Since the component video signal (the luminance signal Y and the color difference signal CD) input to the input terminal 2 does not have to be subjected to processing in the three-dimensional Y/C separation circuit 3 and the color demodulation circuit 5, it is supplied to the output terminal 7 through a terminal b of the switch 6. The switch 6 is switched by a non-illustrated control portion in such a manner that it selects the terminal a if the input video signal is the composite video signal and selects the terminal b if the input video signal is the component video signal.

Incidentally, as a known example which improves the image quality of the composite video signal, there is an example described in Japanese Patent Application Laid-open No.2003-70018.

A phase of a color signal in an NTSC signal or a PAL signal is rotated in a frame cycle. The phase is rotated 180° in one frame in case of the NTSC signal, and the phase is rotated 180° in two frames in case of the PAL signal. In order to detect a motion of an image, a calculation must be carried out by using frames in which color signals are in phase. In such a conventional structure as shown in FIG. 1, a motion of an image must be detected by using a current frame and a frame delayed for two frames in case of the NTSC signal, and a motion of an image must be detected by using a current frame and a frame delayed for four frames in case of the PAL signal. In the conventional video signal processor shown in FIG. 1, therefore, there is a problem that a detection error is apt to be generated in detection of a motion of an image.

On the other hand, the component video signal does not include a dot interference component or a cross-color interference component since it is essentially a signal in which a luminance signal is separated from a color difference signal, but the component video signal including a high-vision (HD) signal transmitted from a broadcasting station in digital broadcast or the like may be a signal obtained by up-converting a standard (SD) signal such as an NTSC signal or a signal obtained by being once converted into a composite video signal in a storing or editing process in the broadcasting station and being restored to the component video signal in some cases. Such a component video signal may aboundingly include dot interference components or cross-color interference components in some cases.

In the conventional video signal processor shown in FIG. 1, the three-dimensional processing cannot be performed with respect to the component video signal including a dot interference component or a cross-color interference component, there is a problem that the dot interference or the cross-color interference is generated. In the structure shown in FIG. 1, adding a circuit which also performs the three-dimensional processing with respect to the component video signal can remove the dot interference component or the cross-color interference component, but a circuit scale becomes large, which results in a great increase in cost.

SUMMARY OF THE INVENTION

In view of the above-described problem, it is an object of the present invention to provide a video signal processor which can improve the detection accuracy of a motion of an image in a composite video signal and improve the image quality of a luminance signal and a color signal (color difference signal) separated from the composite video signal.

Further, it is another object of the present invention to provide a video signal processor which can selectively receive and process a composite video signal and a component video signal while minimizing an increase in a circuit scale or an increase in cost.

Furthermore, it is still another object of the present invention to provide a video signal processor which can remove an image quality debating component even if an input video signal is a component video signal including the image quality debating component while minimizing an increase in circuit scale or an increase in cost, and improve the image quality of the component video signal (or both the composite video signal and the component video signal).

To this end, there is provided a video signal processor which receives a composite video signal and a component video signal, comprising: a simplified Y/C separation circuit (13) which separates the composite video signal into a first luminance signal and a first color signal without subjecting the composite video signal to three-dimensional processing; a color demodulation circuit (14) which color-demodulates the first color signal into a first color difference signal; a three-dimensional processing portion (16) which subjects, to three-dimensional processing, the first luminance signal and the first color difference signal or a second luminance signal and a second color difference signal which constitute the component video signal, to remove an image quality debasing component; and a selector (15) which selectively supplies the first luminance signal and the first color difference signal or the second luminance signal and the second color difference signal to the three-dimensional processing portion.

In a preferred embodiment according to the present invention, the three-dimensional processing portion comprises a mixer which mixes the first luminance signal and the first color signal, and subjects a mixed signal output from the mixer to three-dimensional processing to generate a third luminance signal from which an image quality debasing component is removed.

In the preferred embodiment according to the present invention, the video signal processor further comprises a control portion which selectively stops the three-dimensional processing in the three-dimensional processing portion so that the luminance signal and the color difference signal input to the three-dimensional processing portion may not be subjected to the three-dimensional processing.

Moreover, in order to achieve the above-described aim, there is provided a video signal processor which processes a composite video signal, comprising: a two-dimensional Y/C separation circuit (141, 142, 143) which separates the composite video signal into a first luminance signal and a color signal, and outputs them; a first frame memory (131, 132, 133) which delays the composite video signal as much as a predetermined frame period, and outputs the delayed signal; a first motion detection circuit (181, 182, 183) which detects a motion of an image in the first luminance signal; a three-dimensional Y/C separation circuit (151, 152, 153) which separates from the composite video signal a second luminance signal from which an image quality debasing component is removed as compared with the first luminance signal by three-dimensional processing using the composite video signal and a delayed composite video signal obtained by delaying the composite video signal with the first frame memory, and outputs the separated signal; a first selector (191, 192, 193) which selectively outputs the first luminance signal and the second luminance signal in accordance with a motion detection signal output from the first motion detection circuit; a color demodulation circuit (221, 222, 223) which color-demodulates the color signal and outputs a first color difference signal; a second frame memory (241, 242, 243) which delays the first color difference signal as much as a predetermined frame period, and outputs the delayed signal; a second motion detection circuit (261, 262, 263) which detects a motion of an image in the first color difference signal; a three-dimensional processing circuit (251, 252, 253) which outputs a second color difference signal obtained by removing an image quality debasing component from the first color difference signal by three-dimensional processing using the first color difference signal and a delayed first color difference signal obtained by delaying the first color difference signal with the second frame memory; and a second selector (271, 272, 273) which selectively outputs the first color difference signal and the second color difference signal in accordance with a motion detection signal output from the second motion detection circuit.

Additionally, in order to achieve this above-described aim, there is provided a video signal processor which selectively receives a composite video signal and a component video signal, comprising: a two-dimensional Y/C separation circuit (141, 142, 143) which separates the composite video signal into a first luminance signal and a color signal, and outputs them; a first frame memory (131, 132, 133) which delays a second luminance signal constituting the composite video signal or the component video signal as much as a predetermined frame period, and outputs the delayed signal; a first motion detection circuit (181, 182, 183) which detects a motion of an image in the first luminance signal or a motion of an image in the second luminance signal; a three-dimensional Y/C separation circuit (151, 152, 153) which separates a third luminance signal from the composite video signal and outputs it by three-dimensional processing using the composite video signal and a delayed composite video signal obtained by delaying the composite video signal with the first frame memory when the composite video signal is input to the video signal processor, and outputs a fourth luminance signal obtained by removing an image quality debasing component from the second luminance signal by three-dimensional processing using the second luminance signal and a delayed second luminance signal obtained by delaying the second luminance signal with the first frame memory when the component video signal is input to the video signal processor; a first selector (191, 192, 193) which selectively outputs the first luminance signal and the third luminance signal in accordance with a motion detection signal output from the first motion detection circuit when the composite video signal is input to the video signal processor, and selectively outputs the second luminance signal and the fourth luminance signal in accordance with a motion detection signal output from the first motion detection circuit when the component video signal is input to the video signal processor; a color demodulation circuit (221, 222, 223) which demodulates the color signal, and outputs a first color difference signal; a second frame memory (241, 242, 243) which delays the first color difference signal or a second color difference signal constituting the component video signal as much as a predetermined frame period, and outputs the delayed signal; a second motion detection circuit (261, 262, 263) which detects a motion of an image in the first color difference signal or a motion of an image in the second color difference signal; a three-dimensional processing circuit (251, 252, 253) which outputs a third color difference signal obtained by removing an image quality debasing component from the first color difference signal by three-dimensional processing using the first color difference signal and a delayed first color difference signal obtained by delaying the first color difference signal with the second frame memory when the composite video signal is input to the video signal processor, and outputs a fourth color difference signal obtained by removing an image quality debasing component from the second color difference signal by three-dimensional processing using the second color difference signal and a delayed second color difference signal obtained by delaying the second color difference signal with the second frame memory when the component video signal is input to the video signal processor; and a second selector (271, 272, 273) which selectively outputs the first color difference signal and the third color difference signal in accordance with a motion detection signal output from the second motion detection circuit when the composite video signal is input to the video signal processor, and selectively outputs the second color difference signal and the fourth color difference signal in accordance with a motion detection signal output from the first motion detection circuit when the component video signal is input to the video signal processor.

In a preferred embodiment according to the present invention, the two-dimensional Y/C separation circuit has a first two-dimensional Y/C separation circuit which separates the first luminance signal from the composite video signal and outputs it, and a second two-dimensional Y/C separation circuit which separates the color signal from the composite video signal and outputs it.

In the preferred embodiment according to the present invention, the first two-dimensional Y/C separation circuit and the second two-dimensional Y/C separation circuit have different filter characteristics.

In the preferred embodiment according to the present invention, the first motion detection circuit and the second motion detection circuit generate the motion detection signals in cooperation with each other.

In the preferred embodiment according to the present invention, the composite video signal is an NTSC signal, the first frame memory delays the composite video signal as much as a one-frame period, and the second frame memory delays the first color difference signal as much as a one-frame period.

In the preferred embodiment according to the present invention, the composite video signal is a PAL signal, the first frame memory delays the composite video signal as much as a two-frame period, and the second frame memory delays the first color difference signal as much as a two-frame period.

In the preferred embodiment according to the present invention, the composite video signal is an NTSC signal or a PAL signal, and the video signal processor further comprises a control portion which controls in such a manner that a one-frame-delayed composite video signal obtained by delaying the composite video signal as much as a one-frame period is taken out from the first frame memory and a one-frame-delayed color difference signal obtained by delaying the first color difference signal as much as a one-frame period is taken out from the second frame memory when the NTSC signal as the composite video signal is input to the video signal processor, and controls in such a manner that a two-frame-delayed composite video signal obtained by delaying the composite video signal as much as a two-frame period is taken out from the first frame memory and a two-frame-delayed color difference signal obtained by delaying the first color difference signal as much as a two-frame period is taken out from the second frame memory when the PAL signal as the composite video signal is input to the video signal processor.

The nature, principle and utility of the invention will become more apparent from the following detailed description when read in conjunction with the accompanying drawings.

BRIEF DESCRIPTION OF THE DRAWINGS

In the accompanying drawings:

FIG. 10 is a block diagram showing a sixth embodiment according to the present invention.

DESCRIPTION OF THE PREFERRED EMBODIMENTS

A video signal processor according to the present invention will now be described hereinafter with reference to the accompanying drawings.

First Embodiment

Figure 1:
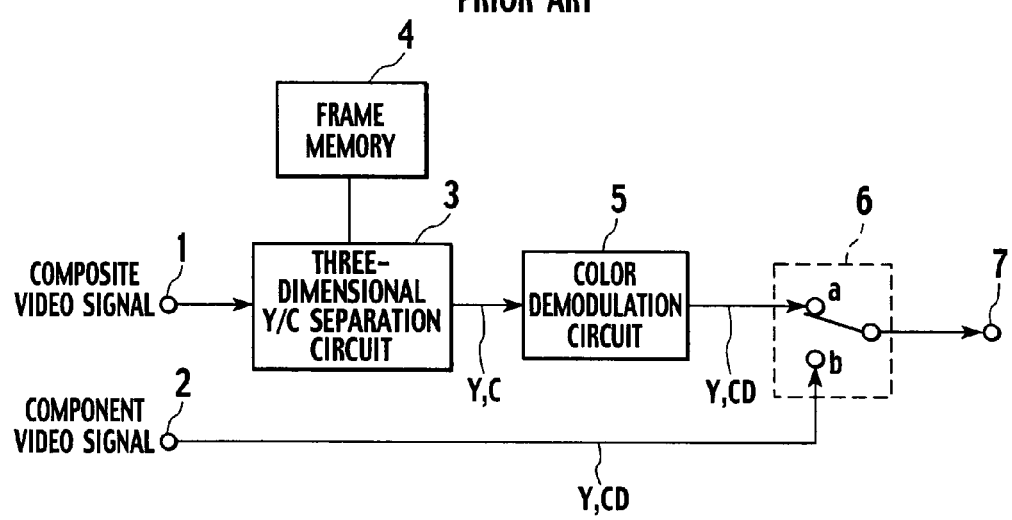
FIG. 1 is a block diagram showing a prior art.
Figure 2:
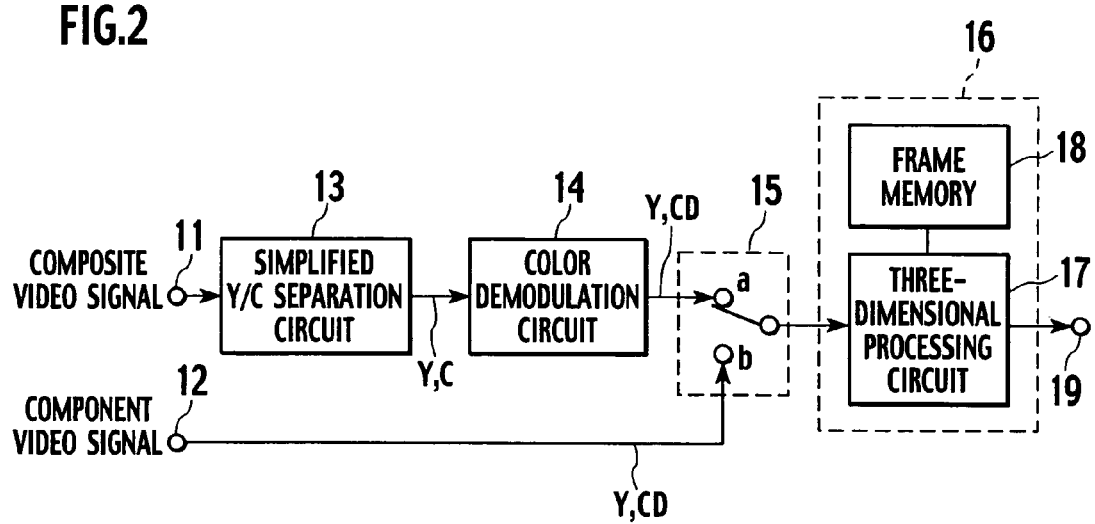
FIG. 2 is a block diagram showing a first embodiment according to the present invention.
Figure 3:
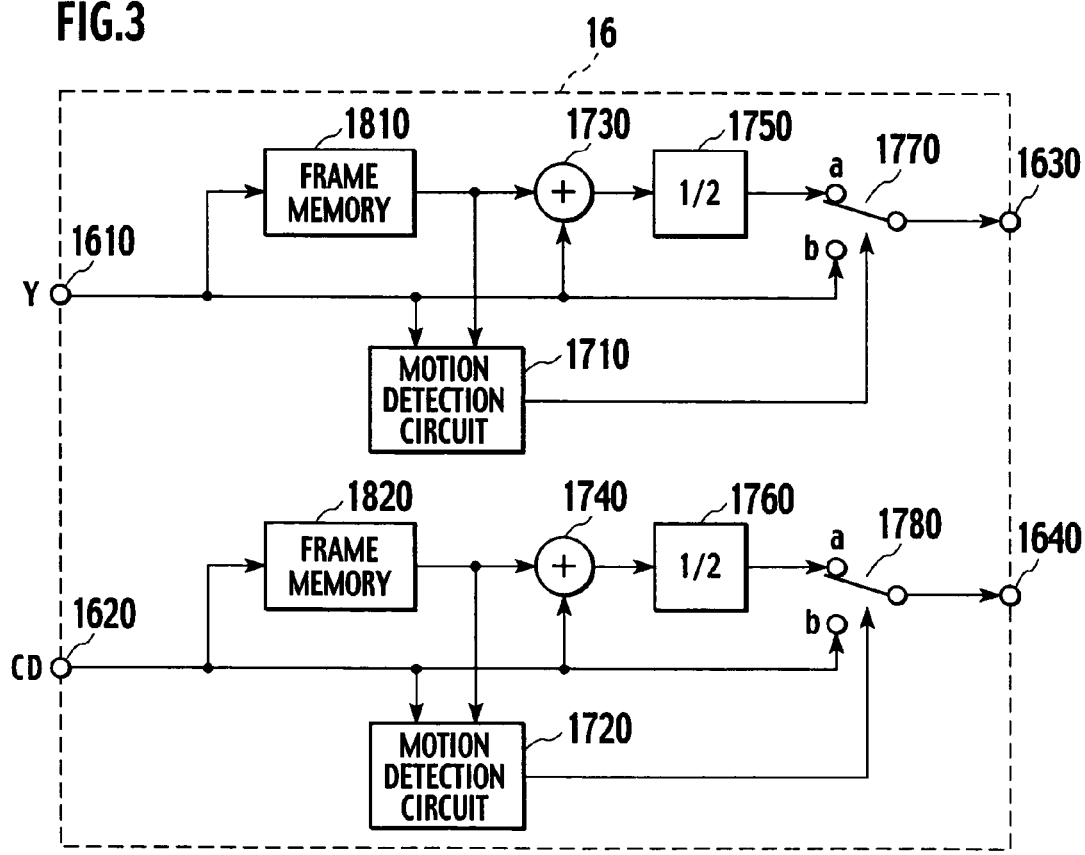
FIG. 3 is a block diagram showing a concrete structural example of a three-dimensional processing portion depicted in FIG. 2.

FIG. 2 is a block diagram showing a first embodiment of a video signal processor according to the present invention. FIG. 3 is a block diagram showing a concrete structural example of a three-dimensional processing portion 16 depicted in FIG. 2.

In FIG. 2, a composite video signal is input to an input terminal 11, and a component video signal is input to an input terminal 12. The composite video signal is input to a simplified Y/C separation circuit 13. The simplified Y/C separation circuit 13 is a Y/C separation circuit which does not include a frame memory (which does not perform three-dimensional processing), and it is, e.g., a band pass filter which extracts a chrominance subcarrier frequency (3.58 MHz in case of the NTSC mode) as a central band, a comb type filter using a line correlation, or a two-dimensional Y/C separation circuit. The simplified Y/C separation circuit 13 separates a Y signal and a C signal from each other in a simplified manner. The Y signal and the C signal output from the simplified Y/C separation circuit 13 are input to a color demodulation circuit 14. The color demodulation circuit 14 color-demodulates the C signal, converts it into a color difference (CD) signal, delays the Y signal, performs time adjustment of the Y signal and the CD signal, and outputs a result.

The Y signal and the CD signal output from the color demodulation circuit 14 are input to a terminal a of a selector 15. The component video signal input to an input terminal 12 is input to a terminal b of the selector 15. The selector 15 is connected to the terminal a when the composite video signal is input (selected), and connected to the terminal b when the component video signal is input (selected) by a control of non-illustrated controlling means (e.g., a microcomputer). Whether the composite video signal is input (selected) or the component video signal is input (selected) can be identified based on, e.g., a type of a tuner selected as a supply source of the video signal (whether it is an analog tuner or a digital tuner) or a type of an external input terminal (whether it is a composite input terminal or a D input terminal).

An output from the selector 15 is input to a three-dimensional processing portion 16 including a three-dimensional processing circuit 17 and a frame memory 18. Here, the three-dimensional processing portion 16 is very simplified and conceptually shown. In the first embodiment, in case of both the Y signal and the CD signal obtained by separating the composite video signal and the Y signal and the CD signal input as the component video signal, such signals are supplied to the three-dimensional processing portion 16, and three-dimensional processing is carried out. The Y signal and the CD signal subjected to the three-dimensional processing are output from an output terminal 19. The Y signal and the CD signal output from the output terminal 19 are supplied to another signal processing circuit which is not shown, and displayed in a display portion.

A concrete structure and operation of the three-dimensional processing portion 16 will now be described with reference to FIG. 3. In FIG. 3, the Y signal is input to an input terminal 1610. The Y signal is input to a frame memory 1810, a motion detection circuit 1710, an adder 1730, and a selector 1770. The frame memory 1810 delays the input Y signal for one frame, and supplies it to the motion detection circuit 1710. The motion detection circuit 1710 detects a motion of an image by using the Y signal input to the input terminal 1610 and the Y signal delayed for one frame by the frame memory 1810. The adder 1730 adds the Y signal output from the frame memory 1810 and the Y signal input to the input terminal 1610. An output from the adder 1730 is input to a divider 1750. The divider 1750 divides an output from the adder 1730 by 2, and supplies a result to a terminal a of the selector 1770. The Y signal input to the input terminal 1610 is supplied to a terminal b of the selector 1770.

The motion detection circuit 1710 controls the selector 1770 in such a manner that the selector 1770 selects the terminal b in a moving image area in which an image is judged to have a motion, and controls the selector 1770 in such a manner that the selector 1770 selects the terminal a in a static image area in which an image is judged to have no motion. In the static image area, a phase of an original Y signal excluding a dot interference component remains the same in both a current frame (Y signal input to the input terminal 1610) and a preceding frame which is a signal obtained by delaying the current frame for one frame (Y signal output from the frame memory 1810). On the other hand, a phase of the dot interference component is reversed depending on the current frame and the preceding frame. The dot interference component alone included in the Y signal can be canceled out and removed by adding the Y signal output from the frame memory 1810 and the Y signal input to the input terminal 1610 by the adder 1730.

The Y signal from which the dot interference component is removed in the static image area is output from an output terminal 1630. In the first embodiment, since three-dimensional processing is carried out with respect to not only the Y signal obtained by separating the composite video signal but also the Y signal input as the component video signal, the dot interference component can be removed in the static image area even if the component video signal including the dot interference component is input, and the image quality of the component video signal can be improved.

On the other hand, in FIG. 3, the CD signal is input to an input terminal 1620. The CD signal is input to a frame memory 1820, a motion detection circuit 1720, an adder 1740, and a selector 1780. The frame memory 1820 delays the input CD signal for one frame, and supplies it to the motion detection circuit 1720. The motion detection circuit 1720 detects a motion of an image by using the CD signal input to the input terminal 1620 and the CD signal delayed for one frame with the frame memory 1820. The adder 1740 adds the CD signal output from the frame memory 1820 and the CD signal input to the input terminal 1620. An output from the adder 1740 is input to a divider 1760. The divider 1760 divides the output from the adder 1740 by 2, and supplies a result to a terminal a of the selector 1780. The CD signal input to the input terminal 1620 is supplied to a terminal b of the selector 1780.

The motion detection circuit 1720 controls the selector 1780 in such a manner that the selector 1780 selects the terminal b in a moving image area in which an image is judged to have a motion, and controls the selector 1780 in such a manner that the selector 1780 selects the terminal a in a static image area in which an image is judged to have no motion. A phase of the original CD excluding a cross-color interference component in the static image area remains the same with respect to both a current frame (CD signal input to the input terminal 1620) and a preceding frame which is a signal obtained by delaying the current frame for one frame (CD signal output from the frame memory 1820). On the other hand, a phase of the cross-color interference component is reversed depending on the current frame and the preceding frame. The cross-color interference component alone included in the CD signal can be canceled out and removed by adding the CD signal output from the frame memory 1820 and the CD signal input to the input terminal 1620 by the adder 1740.

The CD signal from which the cross-color interference component is removed in the static image area is output from an output terminal 1640. In the first embodiment, since three-dimensional processing is carried out with respect to not only the CD signal obtained by separating the composite video signal but also the CD signal input as the component video signal, the cross-color interference component can be removed in the static image area even if the component video signal including the cross-color interference component is input, thereby improving the image quality of the component video signal.

It is to be noted that the frame memories 1810 and 1820 depicted in FIG. 3 correspond to the frame memory 18 shown in FIG. 2, and the structures other than the frame memories 1810 and 1820 depicted in FIG. 3 correspond to the three-dimensional processing circuit 17 shown in FIG. 2. It is preferable that the frame memories 1810 and 1820 have capacities to store SD signals therein and capacities to store HD signals therein.

Second Embodiment

Figure 4:
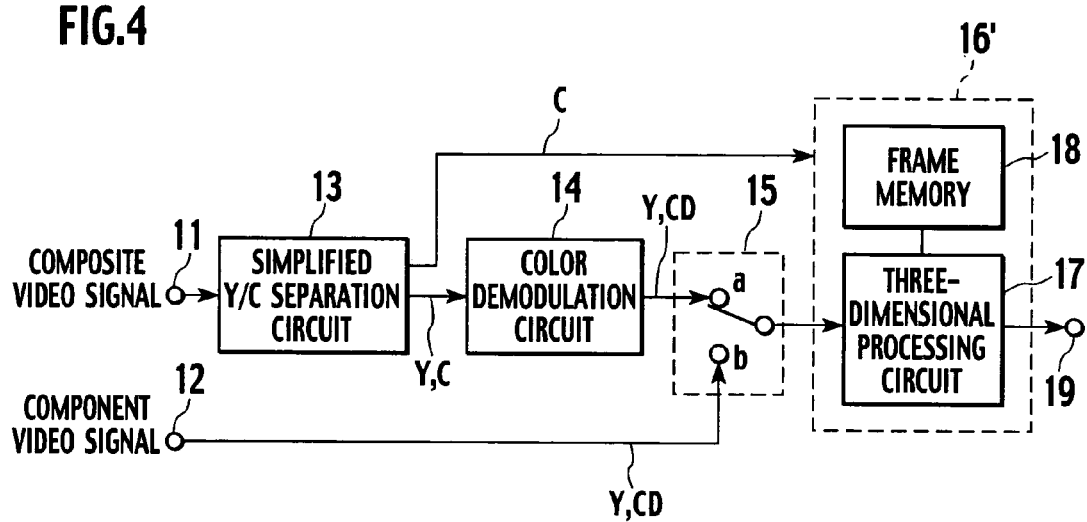
FIG. 4 is a block diagram showing a second embodiment according to the present invention.
Figure 5:
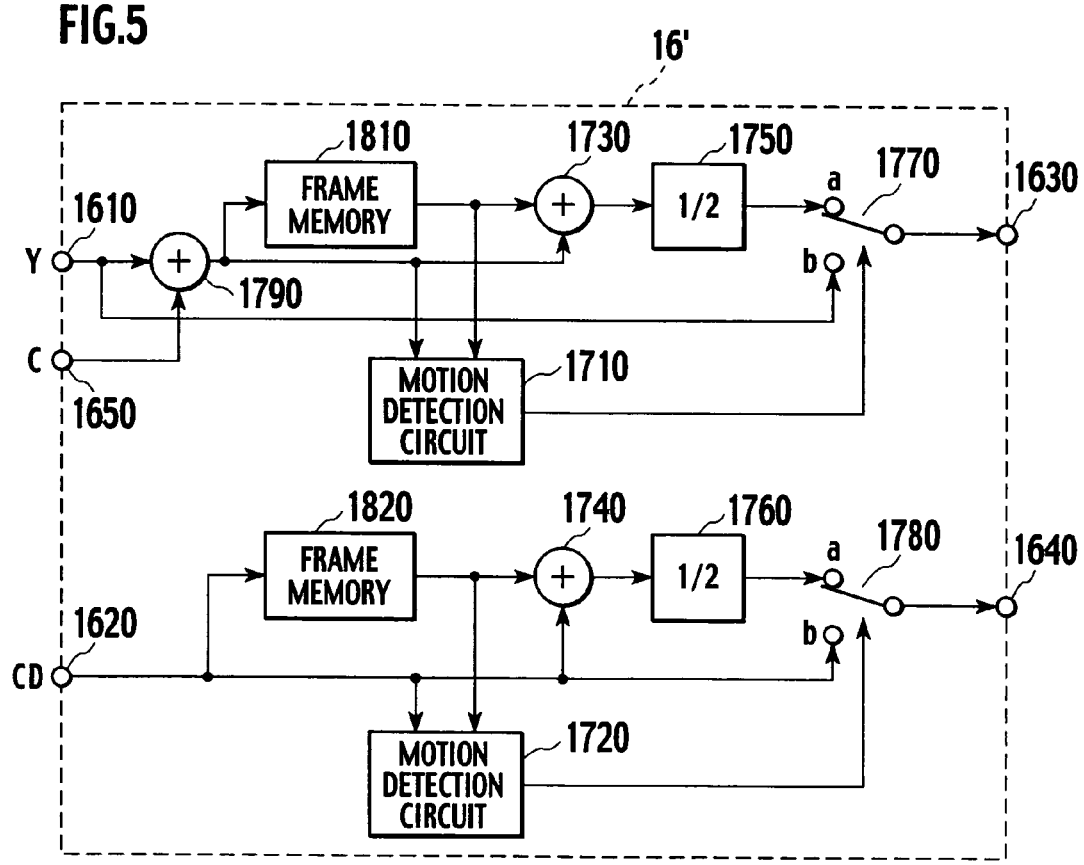
FIG. 5 is a block diagram showing a concrete structural example of a three-dimensional processing portion 16' depicted in FIG. 4.

FIG. 4 is a block diagram showing a second embodiment of the video signal processor according to the present invention. FIG. 5 is a block diagram showing a concrete structural example of a three-dimensional processing portion 16' in FIG. 4.

In the second embodiment shown in FIGS. 4 and 5, like reference numerals denote parts equal to those in the first embodiment shown in FIGS. 2 and 3, and the explanation thereof will be appropriately eliminated. As shown in FIG. 4, the second embodiment is characterized in that the C signal separated by the simplified Y/C separation circuit 13 is input to the three-dimensional processing portion 16' in order to further improve the image quality of the Y signal. Specifically, as shown in FIG. 5, the C signal output from the simplified Y/C separation circuit 13 is input to an input terminal 1650, and a mixer 1790 mixes the Y signal input to the input terminal 1610 with the C signal input to an input terminal 1650, and supplies a result to a motion detection circuit 1710, an adder 1730 and a frame memory 1810. That is, in the second embodiment, the Y signal and the C signal are restored to the composite video signal by mixing these signals by the mixer 1790.

By doing so, as compared with the example in which the Y signal is subjected to the three-dimensional processing by using the Y signal alone separated by the simplified Y/C separation circuit 13, the Y signal component which is lost by the simplified Y/C separation circuit 13 can be restored, thereby improving the image quality of the Y signal in the static image area. Of course, there is no adverse effect caused by addition of the C signal to the Y signal.

Third Embodiment

Figure 6:
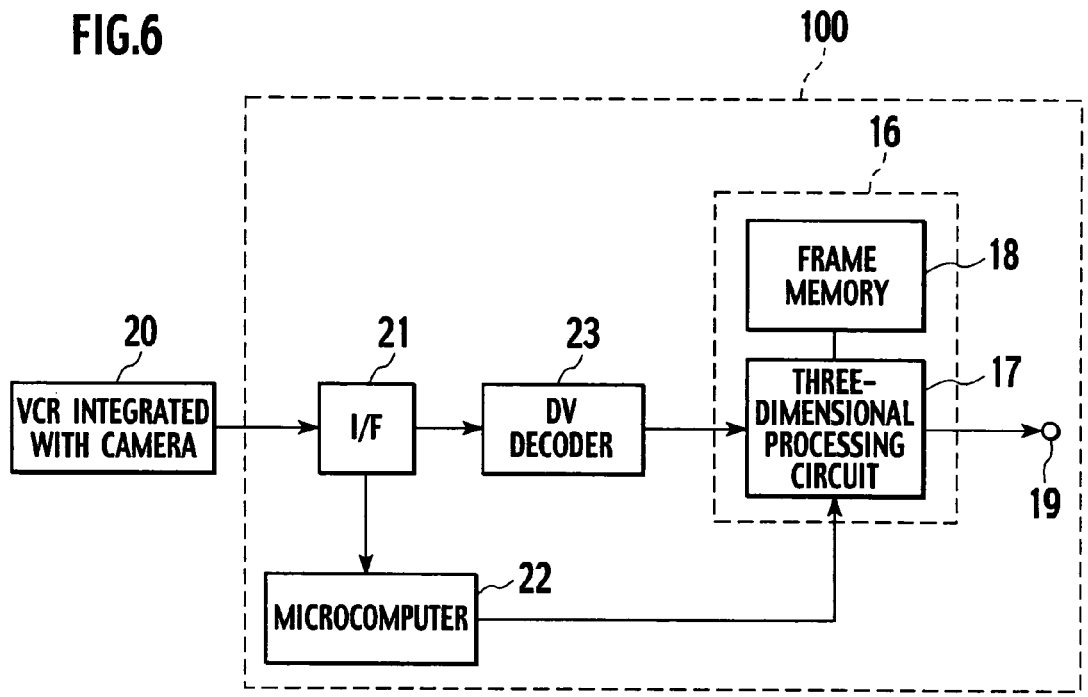
FIG. 6 is a block diagram showing a third embodiment according to the present invention.

FIG. 6 is a block diagram showing a third embodiment of the video signal processor according to the present invention.

Although the first and second embodiments mentioned above perform the three-dimensional processing by using the three-dimensional processing portion 16 even if a processing target is the component video signal, the third embodiment shown in FIG. 6 is configured not to perform the three-dimensional processing with respect to the component video signal which does not include a dot interference component or a cross-color interference component. It is preferable to switch the processing in such a manner that the three-dimensional processing is performed with respect to the component video signal which may possibly include a dot interference component or a cross-color interference component as described above but the three-dimensional processing is not carried out with respect to the component video signal which is considered not to include the dot interference component or the cross-color interference component.

In FIG. 6, like reference numerals denote parts equal to those shown in FIG. 2, and the explanation thereof will be appropriately eliminated. The third embodiment shown in FIG. 6 is an example in which a television receiver 100 including the same structure as that in FIG. 2 is digital-connected with a VCR integrated with a camera 20 through an IEEE1394 interface. The VCR integrated with a camera 20 performs recording/reproduction in the DV mode as an example. The VCR integrated with a camera 20 is connected with an interface portion 21 in the television receiver 100 through the IEEE1394 interface. VAUX data in a stream input from the VCR integrated with a camera 20 is supplied to a microcomputer 22, and a compressed video signal is supplied to a DV decoder 23. The DV decoder 23 decodes the compressed video signal, and supplies a component video signal to a three-dimensional processing portion 16.

In the VAUX data, system data comprising a source code (SOURCE CODE) which is a part of pack data (SOURCE) in which a pack header is 60h (h means hexadecimal numeral) includes information indicative of whether a content recorded on a tape is recorded broadcasting signals or recorded camera shots. Here, Table 1 shows a defined content of the source code in the VAUX data based on the DV standard. In Table 1, identification of Tuner, Pre-recorded tape, and No information is defined by combinations with other system data.

TABLE 1

| SOURCE CODE | Input source |
|---|---|
| 00 | Camera |
| 01 | Line |
| 10 | Cable |
| 11 | Tuner |
| | Pre-recorded Tape |
| | No information |

As shown in Table 1, the source code has a code which is used to identify an input source. If information 00b (b means binary numeral) indicating that camera shots are recorded with the input source being a camera is detected, it can be considered that the component video signal does not include a dot interference component or a cross-color interference component. Thus, if the information indicating that camera shots are recorded is detected, the microcomputer 22 stops the three-dimensional processing in the three-dimensional processing portion 16 in order to prevent the three-dimensional processing from being effected with respect to the component video signal output from the DV decoder 23. Specifically, the selectors 1770 and 1780 shown in FIG. 3 are connected with the terminal b, and the Y signal and the CD signal are passed through. Although the third embodiment described herein is obtained by adding the structure which stops the three-dimensional processing with respect to the component video signal from an external video equipment digital-connected through the IEEE1394 interface to the first embodiment shown in FIG. 2, the same structure can be of course added to the second embodiment depicted in FIG. 4.

Fourth Embodiment

Figure 7:
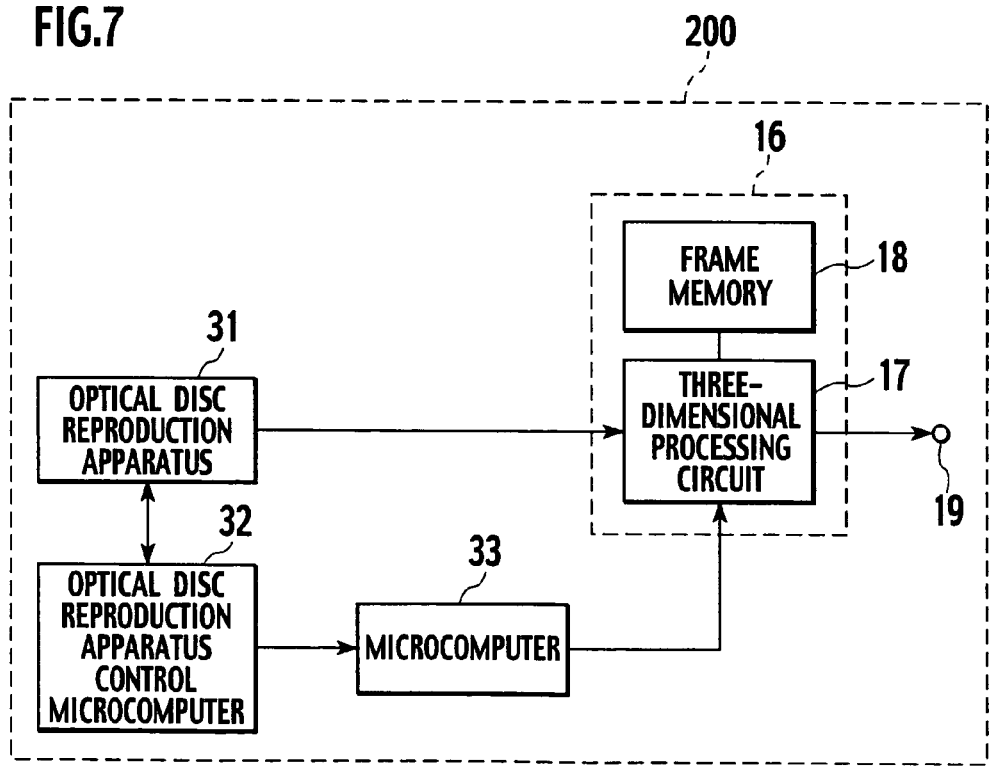
FIG. 7 is a block diagram showing a fourth embodiment according to the present invention.

FIG. 7 is a block diagram showing a fourth embodiment of the video signal processor according to the present invention.

In FIG. 7, like reference numerals denote parts equal to those in FIG. 2, and the explanation thereof will be appropriately eliminated. The fourth embodiment shown in FIG. 7 is an example of a television receiver having a built-in optical disc reproduction apparatus 200 which contains the same structure as that shown in FIG. 2 as well as an optical disc reproduction apparatus (DVD player) 31. The optical disc reproduction apparatus 31 is controlled by an optical disc reproduction apparatus control microcomputer 32, and the optical disc reproduction apparatus control microcomputer 32 can discriminates a type of a disc reproduced by the optical disc reproduction apparatus 31. A component video signal reproduced by the optical disc reproduction apparatus 31 is input to a three-dimensional processing portion 16.

If a disc reproduced by the optical disc reproduction apparatus 31 is a DVD-ROM (commercially available disc), since this does not include information of television broadcasting recorded by a user as different from a DVD-R, a DVD-RW and a DVD-RAM, it can be considered that the component video signal does not include a dot interference component or a cross-color interference component. Thus, upon receiving information indicating that a disc reproduced by the optical disc reproduction apparatus 31 is a DVD- ROM from the optical disc reproduction apparatus control microcomputer 32, the microcomputer 33 stops the three-dimensional processing in the three-dimensional processing portion 16 in order to prevent the three-dimensional processing from being effected with respect to the component video signal which is supplied from the optical disc reproduction apparatus 31 to the three-dimensional processing portion 16. Specifically, the selectors 1770 and 1780 shown in FIG. 3 are connected with the terminal b, and the Y signal and the CD signal are passed through.

The fourth embodiment described herein is obtained by adding to the first embodiment shown in FIG. 2 the structure in which the optical disc reproduction apparatus 31 is built in and which stops the three-dimensional processing when reproducing a disc whose component video signal is considered not to include a dot interference component or a cross-color interference component, but the same structure may be of course added to the second embodiment depicted in FIG. 4.

As another embodiment, a user may visually determine presence/absence of an interference of a video displayed in the display portion and manually switch execution and suspension of the three-dimensional processing.

Fifth Embodiment

Figure 8:
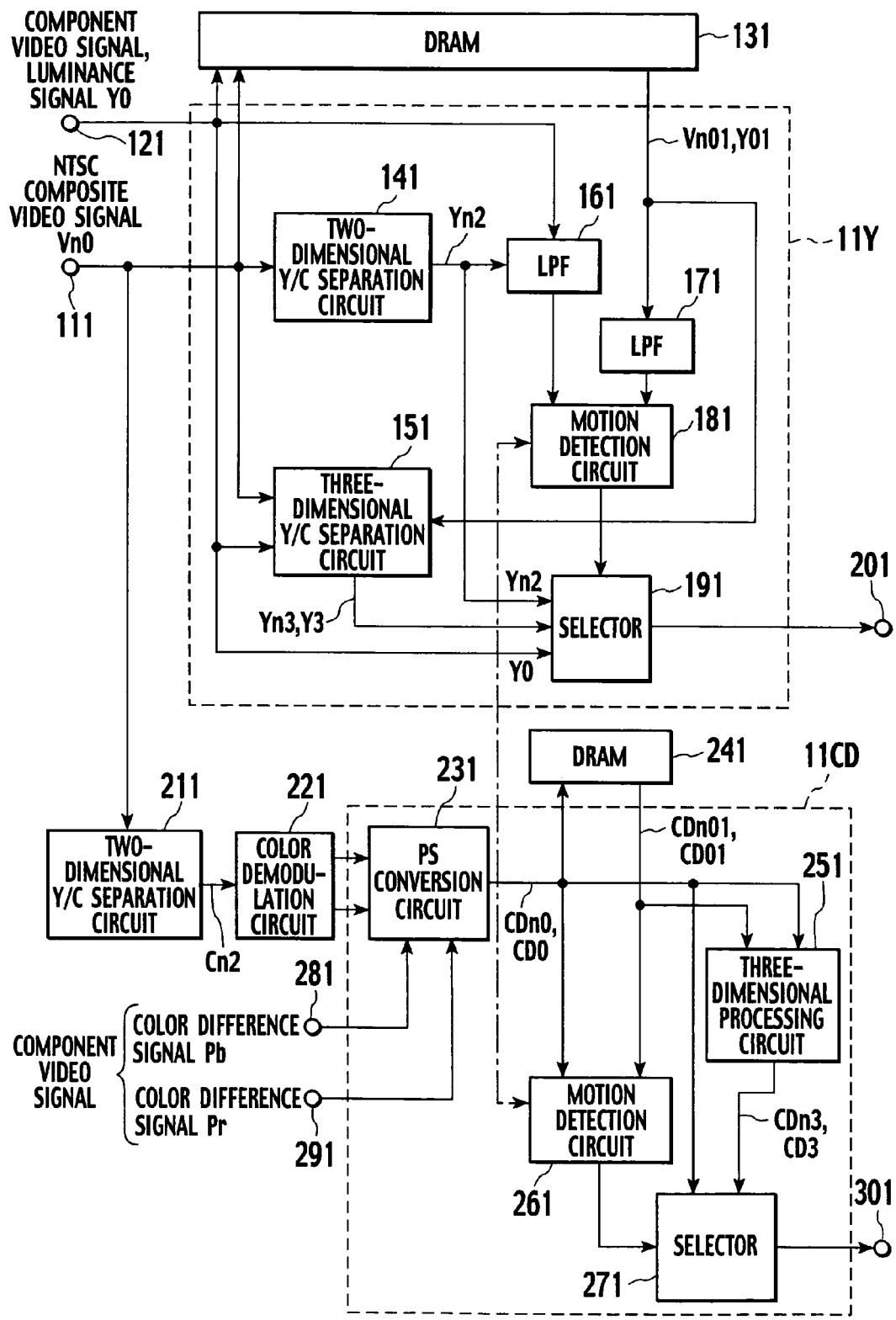
FIG. 8 is a block diagram showing a fifth embodiment according to the present invention.
Figure 9A:
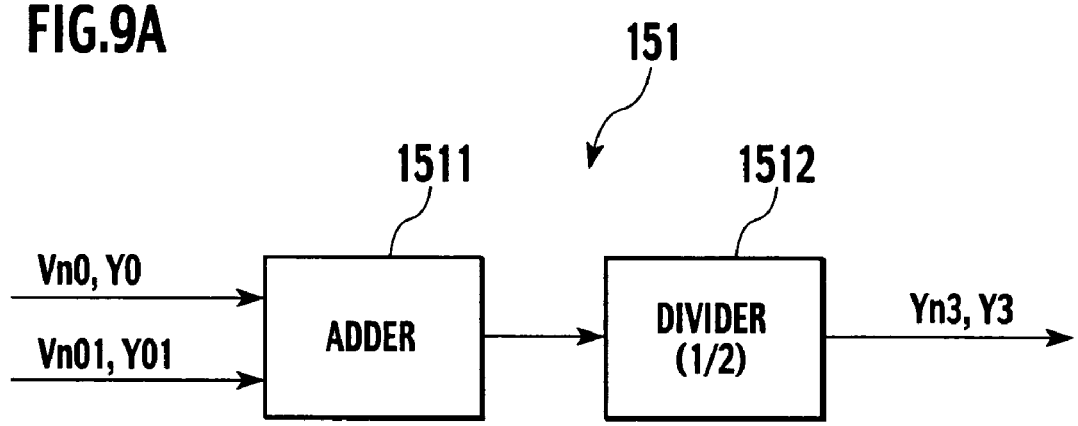
FIGS. 9A and 9B are block diagrams showing concrete structural examples of a three-dimensional Y/C separation circuit 151 and a three-dimensional processing circuit 251 depicted in FIG. 8.
Figure 9B:
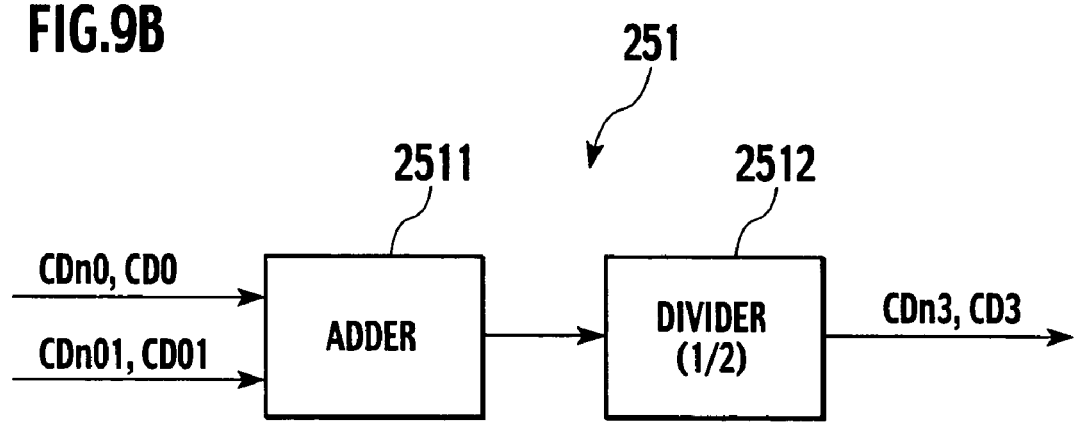

FIG. 8 is a block diagram showing a fifth embodiment of the video signal processor according to the present invention FIGS. 9A and 9B are block diagrams showing concrete structural examples of a three-dimensional Y/C separation circuit 151 and a three-dimensional processing circuit 251 depicted in FIG. 8.

The fifth embodiment shown in FIG. 8 is an embodiment when a composite video signal and a component video signal are selectively input and the input composite video signal is an NTSC signal. In FIG. 8, if the input video signal is an NTSC composite video signal Vn0, the composite video signal Vn0 is input to a video signal processor according to the fifth embodiment through an input terminal 111. If the input video signal is a component video signal, of a luminance signal and color difference signals (e.g., Pb and Pr) constituting the component video signal, a luminance signal Y0 is input to the video signal processing according to the first embodiment through an input terminal 121, and the color difference signals Pb and Pr are input to the video signal processor according to the fifth embodiment through input terminals 281 and 291.

One of characteristics of the video signal processor according to the fifth embodiment lies in that a luminance signal processing portion 11Y which processes a luminance signal and a color difference signal processing portion 11CD which processes color difference signals are provided and the luminance signal and the color difference signals are separately processed.

An operation when the composite video signal Vn0 is input to the input terminal 111 will be first described. The composite video signal Vn0 input to the input terminal 111 is input to a dynamic random access memory (DRAM) 131 which is a frame memory, a two-dimensional Y/C separation circuit 141 and a three-dimensional Y/C separation circuit 151. The composite video signal Vn0 written in the DRAM 131 is delayed as much as a one-frame period and output as a one-frame-delayed composite video signal Vn01.

The two-dimensional Y/C separation circuit 141 separates a luminance signal Yn2 from the composite video signal Vn0 by two-dimensional processing, and outputs it. As the two-dimensional Y/C separation circuit 141, it is possible to adopt, e.g., one which includes a horizontal band pass filter (horizontal BPF) and a vertical band pass filter (vertical BPF), detects a spectral distribution in the horizontal direction and mixes an output from the horizontal BPF and an output from the vertical BPF. The three-dimensional Y/C separation circuit 151 separates and outputs a luminance signal Yn3 by three-dimensional processing using the composite video signal Vn0 and the one-frame-delayed composite video signal Vn01.

As shown in FIG. 9A, the three-dimensional Y/C separation circuit 151 comprises an adder 1511 which adds the composite video signal Vn0 and the one-frame-delayed composite video signal Vn01, and a divider 1512 which divides an output from the adder 1511 by 2.

In the NTSC composite video signal Vn0, a phase of an original luminance signal component excluding a dot interference component in a static image area remains the same with respect to both the composite video signal Vn0 and the one-frame-delayed composite video signal Vn01. On the other hand, a phase of the dot interference component is reversed depending on the composite video signal Vn0 and the one-frame-delayed composite video signal Vn01. The dot interference component alone included in the luminance signal component can be canceled out and removed by adding the composite video signal Vn0 and the one-frame-delayed composite video signal Vn01 by the adder 1511. Therefore, the luminance signal Yn3 output from the three-dimensional Y/C separation circuit 151 is a luminance signal from which a dot interference component is removed.

The luminance signal Yn2 output from the two-dimensional Y/C separation circuit 141 is input to a low-pass filter (LPF) 161. The LPF 161 assuredly removes a color signal component, and it may be eliminated in some cases. The one-frame-delayed composite video signal Vn01 output from the DRAM 131 is input to an LPF 171, and a low-zone component is extracted. As a result, the one-frame-delayed composite video signal Vn01 substantially contains the luminance signal component alone. The luminance signal Yn2 and the luminance signal component of the one-frame-delayed composite video signal Vn01 output from the LPFs 161 and 171 are input to a motion detection circuit 181. The motion detection circuit 181 detects whether an image has a motion by using the input luminance signal Yn2 and the luminance signal component of the one-frame-delayed composite video signal Vn01. A motion detection signal output from the motion detection circuit 181 is supplied to a selector 191.

As a preferred embodiment, the motion detection circuit 181 in the luminance signal processing portion 11Y and a motion detection circuit 261 in a later-described color difference signal processing portion 11CD are coupled with each other as indicated by a dashed line, and configured to finally judge whether an image has a motion in cooperation with each other. That is, the motion detection circuit 181 finally generates a motion detection signal indicating whether an image has a motion based on both a motion detection result in the motion detection circuit 181 and a motion detection result in the motion detection circuit 261.

The luminance signal Yn2 output from the two-dimensional Y/C separation circuit 141 and the luminance signal Yn3 output from the three-dimensional Y/C separation circuit 151 are input to a selector 191. The selector 191 selectively outputs the luminance signal Yn2 and the luminance signal Yn3 in accordance with a motion detection signal supplied from the motion detection circuit 181. That is, the selector 191 selects the luminance signal Yn2 obtained by two-dimensional Y/C separation if the motion detection signal indicates that an image has a motion, and selects the luminance signal Yn3 obtained by three-dimensional Y/C separation if the motion detection signal indicates that the image does not have a motion.

The luminance signal Yn2 or Yn3 output from the selector 191 is output from an output terminal 201.

On the other hand, the composite video signal Vn0 input to the input terminal 111 is also input to a two-dimensional Y/C separation circuit 211. The two-dimensional Y/C separation circuit 211 separates and outputs a color signal Cn2 by two-dimensional processing using the composite video signal Vn0. The two-dimensional Y/C separation circuit 211 obtains the color signal Cn2 which is used to generate a color difference signal supplied to the color difference signal processing portion 11CD. When separating the luminance signal and the color signal from the composite video signal Vn0 by two-dimensional Y/C separation, a circuit configuration which separates the color signal may be simpler than a circuit configuration which separates the luminance signal. Therefore, the two-dimensional Y/C separation circuit 211 can have a simpler structure than that of the two-dimensional Y/C separation circuit 141.

As the two-dimensional Y/C separation circuit 211, it is possible to adopt, e.g., one which includes a horizontal BPF and subjects an output from the horizontal BPF to vertical logical comb filtering. Here, the two-dimensional Y/C separation circuit 141 and the two-dimensional Y/C separation circuit 211 are separately provided, but the luminance signal Yn2 and the color signal Cn2 may be separated from each other by using one two-dimensional Y/C separation circuit.

The color signal Cn2 output from the two-dimensional Y/C separation circuit 211 is input to a color demodulation circuit 221 and turned into color difference signals R-Y and B-Y of a base band. The color difference signals R-Y and B-Y output from the color demodulation circuit 221 are input to a parallel/serial (PS) conversion circuit 231, and output as a color difference signal CDn0 which is a serial signal. The PS conversion circuit 231 is provided for signal processing, and it is not necessarily required. The color difference signal CDn0 is input to a DRAM 241 which is a frame memory, a three-dimensional processing circuit 251, a motion detection circuit 261 and a selector 271.

The color difference signal CDn0 written in the DRAM 241 is delayed as much as a one-frame period, and output as a one-frame-delayed color difference signal CDn01. The one-frame-delayed color difference signal CDn01 is input to the three-dimensional processing circuit 251 and the motion detection circuit 261.

The three-dimensional processing circuit 251 outputs a color difference signal CDn3 by three-dimensional processing using the color difference signal CDn0 and the one-frame-delayed color difference signal CDn01. As shown in FIG. 9B, the three-dimensional processing circuit 251 comprises an adder 2511 which adds the color difference signal CDn0 and the one-frame-delayed color difference signal CDn01, and a divider 2512 which divides an output from the adder 2511 by 2.

In the NTSC composite video signal Vn0, a phase of an original color difference signal component excluding a cross-color interference component remains the same with respect to both the color difference signal CDn0 and the one-frame-delayed color difference signal CDn01 in a static image area. On the other hand, a phase of the cross-color interference component is reversed based on the color difference signal CDn0 and the one-frame-delayed color difference signal CDn01. The cross-color interference component alone included in the color difference signal component can be canceled out and removed by adding the color difference signal CDn0 and the one-frame-delayed color difference signal CDn01 by the adder 2511. The color difference signal CDn3 output from the three-dimensional processing circuit 251 is, therefore, a color difference signal from which a cross-color interference component is removed.

The motion detection circuit 261 detects whether an image has a motion by using the input color difference signal CDn0 and the one-frame-delayed color difference signal CDn01. A motion detection signal output from the motion detection circuit 261 is supplied to the selector 271.

As described above, as a preferred embodiment, the motion detection circuit 261 finally judges whether an image has a motion in cooperation with the motion detection circuit 181. That is, the motion detection circuit 261 finally generates a motion detection signal indicating whether an image has a motion based on a motion detection result in the motion detection circuit 181 and a motion detection result in the motion detection circuit 261.

The color difference signal CDn0 output from the PS conversion circuit 231 and the color difference signal CDn3 output from the three-dimensional circuit 251 are input to the selector 271. The selector 271 selectively outputs the color difference signal CDn0 and the color difference signal CDn3 in accordance with the motion detection signal supplied from the motion detection circuit 261. That is, the selector 271 selects the color difference signal CDn0 obtained by two-dimensional Y/C separation if the motion detection signal indicates that an image has a motion, and selects the color difference signal CDn3 obtained by three-dimensionally processing the color difference signal CDn0 if the motion detection signal indicates that the image has no motion.

The color difference signal CDn0 or the color difference signal CDn3 output from the selector 271 is output from an output terminal 301.

Meanwhile, a phase of the color signal in the NTSC composite video signal is shifted by 180° each frame, and a calculation must be carried out between two frames and other two frames which are in phase in order to detect a motion of an image. In the structure in which the luminance signal processing portion 11Y and the color difference signal processing portion 11CD are not separately provided, therefore, the NTSC composite video signal must be delayed for two frames.

In the video signal processor according to the fifth embodiment, however, the luminance signal processing portion 11Y and the color difference signal processing portion 11CD are separately provided, and the color signal Cn2 is converted into the color difference signal CDn0 of the base band, thereby detecting a motion of an image. Accordingly, as to detection of a motion of an image, performing a calculation between one frame and another frame can suffice. A motion of an image whose motion speed is high can be accurately detected by the motion detection frame by frame, and the image quality of the composite video signal can be improved.

A description will now be given as to an operation when the luminance signal Y0 of the component video signal is input to the input terminal 121 and the color difference signals Pb and Pr are input to the input terminals 281 and 291. The luminance signal Y0 input to the input terminal 121 is input to the DRAM 131, the three-dimensional Y/C separation circuit 151 and the LPF 161. The luminance signal Y0 written in the DRAM 131 is delayed for one frame and output as the one-frame-delayed luminance signal Y01.

One of other characteristics in the video signal processor according to the fifth embodiment lies in that the luminance signal Y0 of the component video signal in which the luminance signal and the color difference signals are separated from each other is input to the three-dimensional Y/C separation circuit 151. As shown in FIG. 9A, the adder 1511 of the three-dimensional Y/C separation circuit 151 adds the luminance signal Y0 and the one-frame-delayed luminance signal Y01. The luminance signal Y3 from which a dot interference component is removed is obtained from the three-dimensional Y/C separation circuit 151 by the three-dimensional processing with respect to this luminance signal Y0.

The motion detection circuit 181 detects whether an image has a motion based on the luminance signal Y0 input through the LPF 161 and the one-frame-delayed luminance signal Y01 input through the LPF 171. The luminance signal Y0 and the luminance signal Y3 output from the three-dimensional Y/C separation circuit 151 are input to the selector 191. The selector 191 selectively outputs the luminance signal Y0 and the luminance signal Y3 in accordance with the motion detection signal supplied from the motion detection circuit 181. That is, the luminance signal Y0 is selected when the motion detection signal indicates that an image has a motion, and the luminance signal Y3 subjected to the three-dimensional processing by the three-dimensional Y/C separation circuit 151 is selected when the motion detection signal indicates that the image has no motion.

The luminance signal Y0 or Y3 output from the selector 191 is output from the output terminal 201.

On the other hand, the color difference signals Pb and Pr input to the input terminals 281 and 291 are input to the PS conversion circuit 231, and output as the color difference signal CD0 which is a serial signal. The color difference signal CD0 is input to the DRAM 241, the three-dimensional processing circuit 251, the motion detection circuit 261 and the selector 271. The color difference signal CD0 written in the DRAM 241 is delayed as much as a one-frame period and output as the one-frame-delayed color difference signal CD01. The one-frame-delayed color difference signal CD01 is input to the three-dimensional processing circuit 251 and the motion detection circuit 261.

The three-dimensional processing circuit 251 outputs the color difference signal CD3 by the three-dimensional processing using the color difference signal CD0 and the one-frame-delayed color difference signal CD01. As shown in FIG. 9B, the adder 2511 of the three-dimensional processing circuit 251 adds the color difference signal CD0 and the one-frame-delayed color difference signal CD01. The color difference signal CD3 from which a cross-color interference component is removed can be obtained from the three-dimensional processing circuit 251 by the three-dimensional processing with respect to this color difference signal CD0.

The motion detection circuit 261 detects whether an image has a motion by using the input color difference signal CD0 and the one-frame-delayed color difference signal CD01. The color difference signal CD0 and the color difference signal CD3 output from the three-dimensional processing circuit 251 are input to the selector 271. The selector 271 selectively outputs the color difference signal CD0 and the color difference signal CD3 in accordance with the motion detection signal supplied from the motion detection circuit 261. That is, the color difference signal CD0 is selected when the motion detection signal indicates that an image has a motion, and the color difference signal CD3 obtained by subjecting the color difference signal CD0 to the three-dimensional processing is selected when the motion detection signal indicates that the image has no motion.

The color difference signal CD0 or the color difference signal CD3 output from the selector 271 is output from the output terminal 301.

In the video signal processor according to the fifth embodiment, since the three-dimensional processing is performed with respect to not only the composite video signal Vn0 but also the luminance signal Y0 input as the component video signal, a dot interference component can be removed in a static image area even when the component video signal including the dot interference component is input. Further, since the three-dimensional processing is carried out with respect to not only the color difference signal obtained by separating the composite video signal Vn0 but also the color difference signals Pb and Pr input as the component video signal, a cross-color interference component can be removed in a static image area even when the component video signal including the cross-color interference component is input.

According to the video signal processor of the fifth embodiment, therefore, the image quality of the component video signal can be improved.

Sixth Embodiment

FIG. 10 is a block diagram showing a sixth embodiment of the video signal processor according to the present invention. The sixth embodiment shown in FIG. 10 is an embodiment when an input composite video signal is a PAL signal. In FIG. 10, if an input video signal is a PAL composite video signal Vp0, the composite video signal Vp0 is input to the video signal processor according to the sixth embodiment through an input terminal 112. If an input video signal is a component video signal, of a luminance signal and color difference signals (e.g., Pb and Pr) constituting the component video signal, a luminance signal Y0 is input to the video signal processor according to the sixth embodiment through an input terminal 122, and a color difference signals Pb and Pr are input to the video signal processor according to the sixth embodiment through input terminals 282 and 292.

A circuit configuration of the video signal processor according to the sixth embodiment is substantially the same as the circuit configuration of the video signal processor according to the fifth embodiment. However, DRAMs 132 and 242 in the video signal processor according to the sixth embodiment delay an input signal as much as a two-frame period and output a result, as different from the DRAMs 131 and 241 in the video signal processor according to the fifth embodiment. Except that 12Y denotes a luminance signal processing portion and 12CD designates a color difference signal processing portion in the sixth embodiment, reference numerals which are obtained by replacing 1 at the end of each reference numeral denoting each constituent element in the video signal processor according to the fifth embodiment with 2 designate respective constituent elements in the video signal processor according to the sixth embodiment.

Differences in operations of the video signal processor according to the sixth embodiment from the video signal processor according to the fifth embodiment will now be mainly described hereinafter, and the explanation of common parts will be appropriately eliminated. It is to be noted that an operation when a component video signal is input is the same as that in the fifth embodiment, thereby eliminating the explanation thereof.

A composite video signal Vp0 written in a DRAM 132 is delayed as much as a two-frame period, and output as a two-frame-delayed composite video signal Vp02. A two-dimensional Y/C separation circuit 142 separates a luminance signal Yp2 from the composite video signal Vp0 by two-dimensional processing, and outputs it. A three-dimensional Y/C separation circuit 152 separates and outputs a luminance signal Yp3 by three-dimensional processing using the composite video signal Vp0 and the two-frame-delayed composite video signal Vp02. The three-dimensional separation circuit 152 has the same structure as that shown in FIG. 9A.

In the PAL composite video signal, a phase of an original luminance signal component excluding a dot interference component remains the same with respect to both the composite video signal Vp0 and the two-frame-delayed composite video signal Vp02 in a static image area. On the other hand, a phase of the dot interference component is reversed depending on the composite video signal Vp0 and the two-frame-delayed composite video signal Vp02. The dot interference component alone included in the luminance signal component can be canceled out and removed by adding the composite video signal Vp0 and the two-frame-delayed composite video signal Vp02. The luminance signal Yp3 output from the three-dimensional Y/C separation circuit 152 is, therefore, a luminance signal from which a dot interference component is removed.

The luminance signal Yp2 output from the two-dimensional Y/C separation circuit 142 and the luminance signal Yp3 output from the three-dimensional Y/C separation circuit 152 are input to a selector 192. The selector 192 selectively outputs the luminance signal Yp2 and the luminance signal Yp3 in accordance with a motion detection signal supplied from a motion detection circuit 182. That is, the luminance signal Yp2 obtained by the two-dimensional Y/C separation is selected when the motion detection signal indicates that an image has a motion, and the luminance signal Yp3 obtained by the three-dimensional Y/C separation is selected when the motion detection signal indicates that the image has no motion. The luminance signal Yp2 or Yp3 output from the selector 192 is output from an output terminal 202.

On the other hand, the two-dimensional Y/C separation circuit 212 separates a color signal Cp2 from the composite video signal Vp0 by two-dimensional processing, and outputs it. The color signal Cp2 output from the two-dimensional Y/C separation circuit 212 is input to a color demodulation circuit 222, and turned into color difference signals R-Y and B-Y of a base band. A color difference signal CDp0 which is a serial signal output from a PS conversion circuit 232 is written in the DRAM 242, delayed as much as a two-frame period, and output as a two-frame-delayed color difference signal CDp02. The three-dimensional processing circuit 252 outputs a color difference signal CDp3 by three-dimensional processing using the color difference signal CDp0 and the two-frame-delayed color difference signal CDp02. The three-dimensional processing circuit 252 has the same structure as that shown in FIG. 9B.

In the PAL composite video signal Vp0, a phase of an original color difference signal component excluding a cross-color interference component remains the same with respect to both the color difference signal CDp0 and the two-frame-delayed color difference signal Cdn02 in a static image area. On the other hand, a phase of the cross-color interference component is reversed depending on the color difference signal CDp0 and the two-frame-delayed color difference signal CDp02. The cross-color interference component alone included in the color difference signal component can be canceled out and removed by adding the color difference signal CDp0 and the two-frame-delayed color difference signal CDp02. The color difference signal CDp3 output from the three-dimensional processing circuit 252 is, therefore, a color difference signal from which a cross-color interference component is removed.

A selector 272 selectively outputs the color difference signal CDp0 and the color difference signal CDp3 in accordance with a motion detection signal supplied from a motion detection circuit 262. That is, the color difference signal CDp0 obtained by the two-dimensional Y/C separation is selected when the motion detection signal indicates that an image has a motion, and the color difference signal CDp3 obtained by subjecting the color difference signal CDp0 to the three-dimensional processing is selected when the motion detection signal indicates that the image has no motion. The color difference signal CDp0 or the color difference signal CDp3 output from the selector 272 is output from an output terminal 302.

Meanwhile, a phase of the color signal in the PAL composite video signal is shifted by 180° each couple of frames, and a calculation must be carried out between four frames and other four frames which are in phase in order to detect a motion of an image. In a structure in which the luminance signal processing portion 12Y and the color difference signal processing portion 12CD are not separately provided, therefore, the PAL composite video signal must be delayed for four frames.

In the video signal processor according to the sixth embodiment, however, the luminance signal processing portion 12Y and the color difference signal processing portion 12CD are separately provided, and the color signal Cp2 is converted into the color difference signal CDp0 of a base band, thereby detecting a motion of an image. Accordingly, in order to detect a motion of an image, performing a calculation between two frames and another two frames can suffice. A motion of an image having a high motion speed can be accurately detected by the motion detection each couple of frames thereby improving the image quality of the composite video signal.

In the video signal processor according to the sixth embodiment, since the three-dimensional processing is carried out with respect to not only the composite video signal Vp0 but also the luminance signal Y0 input as the component video signal, a dot interference component can be removed in a static image area even if the component video signal including the dot interference component is input. Furthermore, since the three-dimensional processing is effected with respect to not only the color difference signal obtained by separating the composite video signal Vp0 but also the color difference signals Pb and Pr input as the component video signal, a cross-color interference component can be removed in a static image area even if the component video signal including the cross-color interference component is input.

According to the video signal processor of the sixth embodiment, therefore, the image quality of the component video signal can be improved.

Seventh Embodiment

Figure 11:
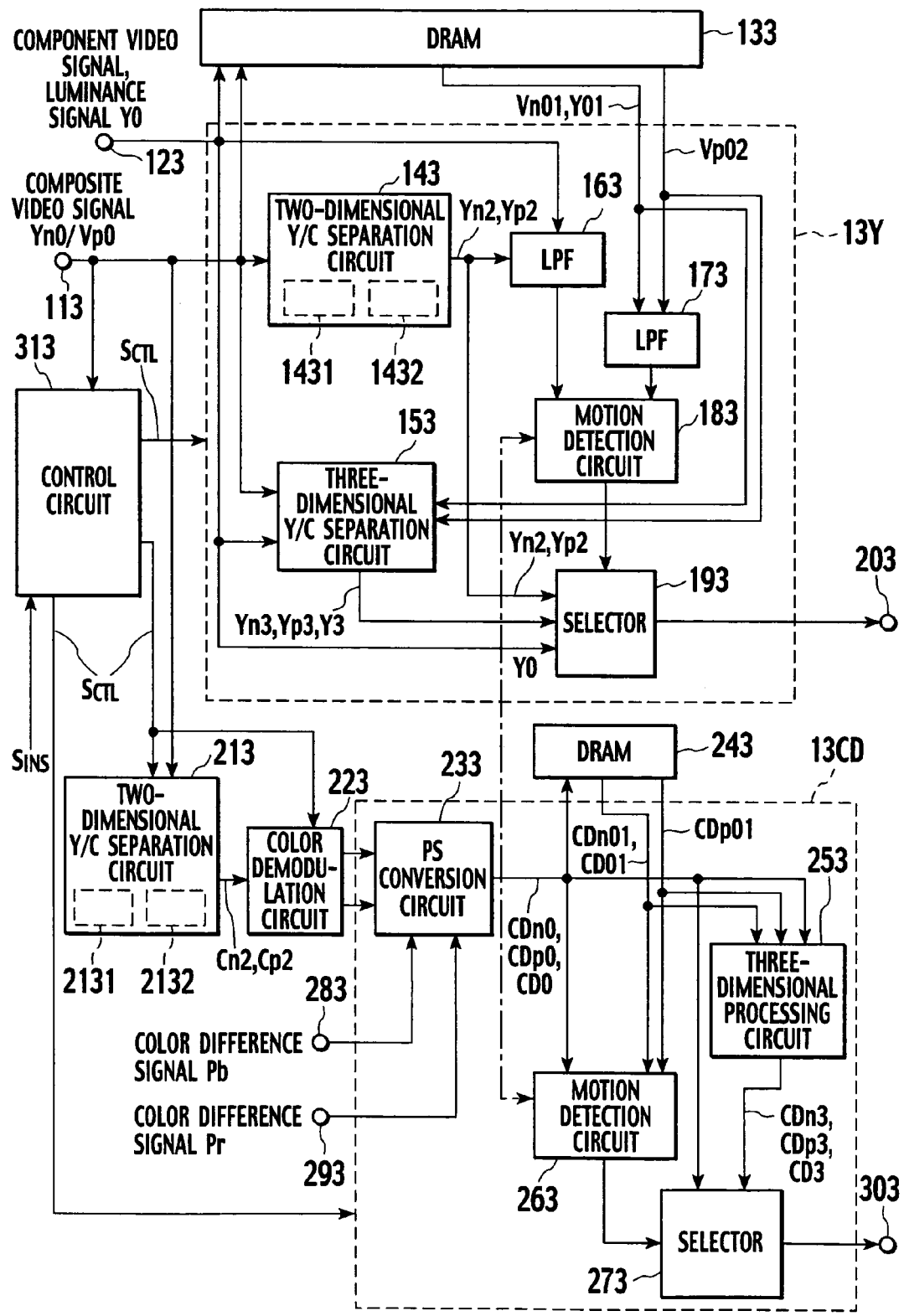
FIG. 11 is a block diagram showing a seventh embodiment according to the present invention.

FIG. 11 is a block diagram showing a seventh embodiment of the video signal processor according to the present invention.

The seventh embodiment shown in FIG. 11 is an embodiment associated with both an NTSC signal and a PAL signal as composite video signals to be inputted. An NTSC composite video signal Vn0 or a PAL composite video signal Vp0 is selectively input to an input terminal 113, and supplied to the video signal processor according to the seventh embodiment. Input terminals which respectively receive a composite video signal Vn0 and a composite video signal Vp0 and a switch which is selectively connected with these input terminals may be provided, and one of the composite video signal Vn0 and the composite video signal Vp0 may be input to the video signal processor according to the seventh embodiment.

A large part of a circuit configuration of the video signal processor according to the seventh embodiment is substantially the same as the circuit configurations of the video signal processors according to the fifth and sixth embodiments. DRAMs 133 and 243 in the video signal processor according to the seventh embodiment can delay an input signal as much as a two-frame period and output it, and they can take out an output obtained by delaying an input signal as much as a one-frame period and an output obtained by delaying an input signal as much as a two-frame period based on switching of memory access. Furthermore, in the seventh embodiment, a control circuit 313 is newly provided. Except that 13Y denotes a luminance signal processing portion and 13CD designates a color difference signal processing portion in the seventh embodiment, reference numerals obtained by replacing 1 at the end of each reference numeral denoting each constituent element in the video signal processing according to the fifth embodiment with 3 designate respective constituent elements in the video signal processor according to the seventh embodiment.

Differences in operations of the video signal processor according to the seventh embodiment from the video signal processors according to the fifth and sixth embodiments will be mainly described hereinafter, and the explanation of common parts will be appropriately eliminated. It is to be noted that an operation when a component video signal is input is the same as those in the fifth and sixth embodiment, and the explanation thereof will be eliminated.

In FIG. 11, an NTSD composite video signal Vn0 or a PAL composite video signal Vp0 input to an input terminal 113 is also input to a control circuit 313. The control circuit 313 is, e.g., a microcomputer, and judges whether the input composite video signal is an NTSC signal or a PAL signal. Moreover, the control circuit 313 controls each circuit portion based on a judgment result.

A structure of an ideal filter which is used when performing two-dimensional Y/C separation differs depending on the NTSC composite video signal Vn0 and the PAL composite video signal Vp0. Thus, a two-dimensional Y/C separation circuit 143 of a luminance signal processing portion 13Y comprises a filter 1431 which is preferable for extracting a luminance signal Yn2 by subjecting the NTSC composite video signal Vn0 to two-dimensional Y/C separation, and a filter 1432 which is preferable for extracting a luminance signal Yp2 by subjecting the PAL composite video signal Vp02 to two-dimensional Y/C separation. The control circuit 313 switches the filter 1431 or the filter 1432 to be used by utilizing a control signal $S_{CTL}$ in accordance with whether the input composite video signal is the NTSC signal or the PAL signal.

Moreover, a two-dimensional Y/C separation circuit 213 of the color difference signal processing portion 13CD comprises a filter 2131 which is preferable for extracting a color signal Cn2 by subjecting the NTSC composite video signal Vn0 to two-dimensional Y/C separation, and a filter 2132 which is preferable for extracting a color signal Cp2 by subjecting the PAL composite video signal Vp0 to two-dimensional Y/C separation. The control circuit 313 switches the filter 2131 or the filter 2132 to be used by utilizing a control signal $S_{CTL}$ in accordance with whether the input composite video signal is the NTSC signal or the PAL signal.

The control circuit 313 also changes color demodulation in a color demodulation circuit 223 by using the control signal $S_{CTL}$ in accordance with whether the input composite video signal is the NTSC signal or the PAL signal.

Additionally, as apparent from the above explanation of the fifth embodiment and the sixth embodiment, a delay quantity of each of delay signals used in the motion detection circuits 183 and 263, three-dimensional Y/C separation circuit 153 and the three-dimensional processing circuit 253 varies depending on the NTSC composite video signal Vn0 and the PAL composite video signal Vp0.

Thus, the control circuit 313 switches the memory access in such a manner that the luminance signal processing portion 13Y and the color difference signal processing portion 13CD take out a one-frame-delayed composite video signal Vn01 and a one-frame-delayed color difference signal CDn01 from the DRAMs 133 and 243 if the input composite video signal is the NTSC signal, and the luminance signal processing portion 13Y and the color difference signal processing portion 13CD take out a two-frame-delayed composite video signal Vp02 and a two-frame-delayed color difference signal CDp02 from the DRAMs 133 and 243 if the input composite video signal is the PAL signal.

An instruction signal $S_{INS}$ which instructs the video signal processor according to the seventh embodiment to perform an operation according to the NTSC composite video signal Vn0 or an operation according to the PAL composite video signal Vp0 and which is obtained by, e.g., a user manipulation can be input to the control circuit 313. The operation of the video signal processor according to the seventh embodiment may be switched by using the instruction signal $S_{INS}$.

As described above, according to the video signal processor of the present invention, an increase in circuit scale or an increase in cost can be minimized, and an image quality debasing component (a dot interference component or a cross-color interference component) can be removed even if an input video signal is a component video signal including the image quality debasing component, thereby improving the image quality of the component video signal. If the input video signal is a composite video signal, a high-quality picture without a dot interference or a cross-color interference can be likewise obtained.

Further, according to the video signal processor of the present invention, the accuracy of detecting a motion of an image in a composite video signal can be improved, and the image quality of a luminance signal and a color signal (color difference signal) separated from the composite video signal can be improved.

Furthermore, an increase in circuit scale or an increase in cost can be suppressed to the minimum level, and a composite video signal and a component video signal can be selectively input and processed.

It should be understood that many modifications and adaptations of the invention will become apparent to those skilled in the art and it is intended to encompass such obvious modifications and changes in the scope of the claims appended hereto.

What is claimed is:

1. A video signal processor which receives a composite video signal and a component video signal, comprising:

a simplified Y/C separation circuit which separates the composite video signal into a first luminance signal and a first color signal without subjecting the composite video signal to three-dimensional processing;

a color demodulation circuit which color-demodulates the first color signal into a first color difference signal;

a three-dimensional processing portion which subjects, to three-dimensional processing, the first luminance signal and the first color difference signal or a second luminance signal and a second color difference signal which constitute the component video signal, to remove an image quality debasing component; and a selector which selectively supplies the first luminance signal and the first color difference signal or the second luminance signal and the second color difference signal to the three-dimensional processing portion, wherein the three-dimensional processing portion comprises a mixer which mixes the first luminance signal and the first color signal, and subjects a mixed signal output from the mixer to three-dimensional processing to generate a third luminance signal from which an image quality debasing component is removed.

2. A video signal processor, which receives a composite video signal and a component video signal, comprising:

a simplified Y/C separation circuit which separates the composite video signal into a first luminance signal and a first color signal without subjecting the composite video signal to three-dimensional processing;

a color demodulation circuit which color-demodulates the first color signal into a first color difference signal;

a three-dimensional processing portion which subjects, to three-dimensional processing, the first luminance signal and the first color difference signal or a second luminance signal and a second color difference signal which constitute the component video signal, to remove an image quality debasing component;

a selector which selectively supplies the first luminance signal and the first color difference signal or the second luminance signal and the second color difference signal to the three-dimensional processing portion; and a control portion which selectively stops the three-dimensional processing in the three-dimensional processing portion so that the luminance signal and the color difference signal input to the three-dimensional processing portion may not be subjected to the three-dimensional processing.

3. A video signal processor which processes a composite video signal, comprising:

a two-dimensional Y/C separation circuit which separates the composite video signal into a first luminance signal and a color signal, and outputs them;

a first frame memory which delays the composite video signal as much as a predetermined frame period, and outputs the delayed signal;

a first motion detection circuit which detects a motion of an image in the first luminance signal;

a three-dimensional Y/C separation circuit which separates from the composite video signal a second luminance signal from which an image quality debasing component is removed as compared with the first luminance signal by three-dimensional processing using the composite video signal and a delayed composite video signal obtained by delaying the composite video signal with the first frame memory, and outputs the separated signal;

a first selector which selectively outputs the first luminance signal and the second luminance signal in accordance with a motion detection signal output from the first motion detection circuit;

a color demodulation circuit which color-demodulates the color signal and outputs a first color difference signal;

a second frame memory which delays the first color difference signal as much as a predetermined frame period, and outputs the delayed signal;

a second motion detection circuit which detects a motion of an image in the first color difference signal;

a three-dimensional processing circuit which outputs a second color difference signal obtained by removing an image quality debasing component from the first color difference signal by three-dimensional processing using the first color difference signal and a delayed first color difference signal obtained by delaying the first color difference signal with the second frame memory; and a second selector which selectively outputs the first color difference signal and the second color difference signal in accordance with a motion detection signal output from the second motion detection circuit.

4. The video signal processor according to claim 3, wherein the two-dimensional Y/C separation circuit has a first two-dimensional Y/C separation circuit which separates the first luminance signal from the composite video signal and outputs it, and a second two-dimensional Y/C separation circuit which separates the color signal from the composite video signal and outputs it.

5. The video signal processor according to claim 4, wherein the first two-dimensional Y/C separation circuit and the second two-dimensional Y/C separation circuit have different filter characteristics.

6. The video signal processor according to claim 3, wherein the first motion detection circuit and the second motion detection circuit generate the motion detection signals in cooperation with each other.

7. The video signal processor according to claim 3, wherein the composite video signal is an NTSC signal, the first frame memory delays the composite video signal as much as a one-frame period, and the second frame memory delays the first color difference signal as much as a one-frame period.

8. The video signal processor according to claim 3, wherein the composite video signal is a PAL signal, the first frame memory delays the composite video signal as much as a two-frame period, and the second frame memory delays the first color difference signal as much as a two-frame period.

9. The video signal processor according to claim 3, wherein the composite video signal is an NTSC signal or a PAL signal, and the video signal processor further comprises a control portion which controls in such a manner that a one-frame-delayed composite video signal obtained by delaying the composite video signal as much as a one-frame period is taken out from the first frame memory and a one-frame-delayed color difference signal obtained by delaying the first color difference signal as much as a one-frame period is taken out from the second frame memory when the NTSC signal as the composite video signal is input to the video signal processor, and controls in such a manner that a two-frame-delayed composite video signal obtained by delaying the composite video signal as much as a two-frame period is taken out from the first frame memory and a two-frame-delayed color difference signal obtained by delaying the first color difference signal as much as a two-frame period is taken out from the second frame memory when the PAL signal as the composite video signal is input to the video signal processor.

10. A video signal processor which selectively receives a composite video signal and a component video signal, comprising:
  a two-dimensional Y/C separation circuit which separates the composite video signal into a first luminance signal and a color signal, and outputs them;
  a first frame memory which delays a second luminance signal constituting the composite video signal or the component video signal as much as a predetermined frame period, and outputs the delayed signal;
  a first motion detection circuit which detects a motion of an image in the first luminance signal or a motion of an image in the second luminance signal; a three-dimensional Y/C separation circuit which separates a third luminance signal from the composite video signal and outputs it by three-dimensional processing using the composite video signal and a delayed composite video signal obtained by delaying the composite video signal with the first frame memory when the composite video signal is input to the video signal processor, and outputs a fourth luminance signal obtained by removing an image quality debasing component from the second luminance signal by three-dimensional processing using the second luminance signal and a delayed second luminance signal obtained by delaying the second luminance signal with the first frame memory when the component video signal is input to the video signal processor;
  a first selector which selectively outputs the first luminance signal and the third luminance signal in accordance with a motion detection signal output from the first motion detection circuit when the composite video signal is input to the video signal processor, and selectively outputs the second luminance signal and the fourth luminance signal in accordance with a motion detection signal output from the first motion detection circuit when the component video signal is input to the video signal processor;
  a color demodulation circuit which demodulates the color signal, and outputs a first color difference signal;
  a second frame memory which delays the first color difference signal or a second color difference signal constituting the component video signal as much as a predetermined frame period, and outputs the delayed signal;
  a second motion detection circuit which detects a motion of an image in the first color difference signal or a motion of an image in the second color difference signal;
  a three-dimensional processing circuit which outputs a third color difference signal obtained by removing an image quality debasing component from the first color difference signal by three-dimensional processing using the first color difference signal and a delayed first color difference signal obtained by delaying the first color difference signal with the second frame memory when the composite video signal is input to the video signal processor, and outputs a fourth color difference signal obtained by removing an image quality debasing component from the second color difference signal by three-dimensional processing using the second color difference signal and a delayed second color difference signal obtained by delaying the second color difference signal with the second frame memory when the component video signal is input to the video signal processor; and
  a second selector which selectively outputs the first color difference signal and the third color difference signal in accordance with a motion detection signal output from the second motion detection circuit when the composite video signal is input to the video signal processor, and selectively outputs the second color difference signal and the fourth color difference signal in accordance with a motion detection signal output from the first motion detection circuit when the component video signal is input to the video signal processor.

11. The video signal processor according to claim 10, wherein the two-dimensional Y/C separation circuit has a first two-dimensional Y/C separation circuit which separates the first luminance signal from the composite video signal and outputs it, and a second two-dimensional Y/C separation circuit which separates the color signal from the composite video signal and outputs it.

12. The video signal processor according to claim 11, wherein the first two-dimensional Y/C separation circuit and the second two-dimensional Y/C separation circuit have different filter characteristics.

13. The video signal processor according to claim 10, wherein the first motion detection circuit and the second motion detection circuit generate the motion detection signals in cooperation with each other.

14. The video signal processor according to claim 10, wherein the composite video signal is an NTSC signal, the first frame memory delays the composite video signal as much as a one-frame period, and the second frame memory delays the first color difference signal as much as a one-frame period.

15. The video signal processor according to claim 10, wherein the composite video signal is a PAL signal, the first frame memory delays the composite video signal as much as a two-frame period, and the second frame memory delays the first color difference signal as much as a two-frame period.

16. The video signal processor according to claim 10, wherein the composite video signal is an NTSC signal or a PAL signal, and the video signal processor further comprises a control portion which controls in such a manner that a one-frame-delayed composite video signal obtained by delaying the composite video signal as much as a one-frame period is taken out from the first frame memory and a one-frame-delayed color difference signal obtained by delaying the first color difference signal as much as a one-frame period is taken out from the second frame memory when the NTSC signal as the composite video signal is input to the video signal processor, and controls in such a manner that a two-frame-delayed composite video signal obtained by delaying the composite video signal as much as a two-frame period is taken out from the first frame memory and a two-frame-delayed color difference signal obtained by delaying the first color difference signal as much as a two-frame period is taken out from the second frame memory when the PAL signal as the composite video signal is input to the video signal processor.

* * * * *